United States Patent [19]

Watkins

[11] Patent Number: 5,163,633
[45] Date of Patent: Nov. 17, 1992

[54] APPARATUS FOR WINDING STRIPS OF WEB MATERIAL ONTO SPOOLS

[75] Inventor: Joseph A. Watkins, Rochester, N.Y.

[73] Assignee: Eastman Kodak Company, Rochester, N.Y.

[21] Appl. No.: 684,711

[22] Filed: Apr. 12, 1991

[51] Int. Cl.⁵ .......................................... B65H 18/08
[52] U.S. Cl. .............................................. 242/67.1 R
[58] Field of Search ................... 242/67.1 R, 56 R, 74

[56] References Cited

U.S. PATENT DOCUMENTS

| | | | |
|---|---|---|---|
| 3,457,627 | 7/1969 | Napor et al. | 29/430 |
| 3,499,202 | 3/1970 | Napor et al. | 29/200 |
| 3,606,662 | 9/1971 | Hoover | 29/240 |
| 3,712,553 | 1/1973 | Napor et al. | 242/56 R |
| 3,930,296 | 1/1976 | Hoover | 29/430 |
| 4,056,918 | 11/1977 | Matsumoto | 53/118 |
| 4,080,711 | 3/1978 | Kawada et al. | 29/427 |
| 4,100,667 | 7/1978 | Napor et al. | 29/429 |
| 4,115,913 | 9/1978 | Moriya et al. | 29/450 |
| 4,180,905 | 1/1980 | Klinkhammer et al. | 29/786 |
| 4,589,608 | 5/1986 | Rehklau et al. | 242/56 R X |
| 4,614,019 | 9/1986 | Shimizu et al. | 29/450 |
| 4,656,737 | 4/1987 | Shimizu et al. | 29/806 |
| 4,993,654 | 2/1991 | Suzuki et al. | 242/67.1 R |

FOREIGN PATENT DOCUMENTS

2104479  3/1983  United Kingdom ............. 242/56 R

Primary Examiner—Daniel P. Stodola
Assistant Examiner—John P. Darling
Attorney, Agent, or Firm—Charles E. Snee, III

[57] ABSTRACT

Spools (14) are delivered through a conduit (52) into a cradle (66-86) which is moved by a transfer arm (24) to a spool orienting station (30) where the slots (18) in the cores (16) of the spools are oriented to a first position, after which a transfer arm (32) having vacuum gripper head (186-206) removes the spools and transfers them to a spool winding station (38) with the slots oriented to receive the lead end of a strip (40) of web material to be wound on the spool, after which the wound spool is removed by a transfer arm (44) having a passive gripper (48) and transferred to a subsequent processing station (50).

21 Claims, 7 Drawing Sheets

APPARATUS FOR WINDING STRIPS OF WEB MATERIAL ONTO SPOOLS

TECHNICAL FIELD

The present invention is related to apparatus for winding strips of web material onto spools. More particularly, the invention concerns such apparatus for winding strips of light sensitive material such as photographic film or paper onto spools.

BACKGROUND ART

Various apparatus have been developed over the years for spooling strips of web material such as photographic film. In one such apparatus, spools of the type having a core with a longitudinally extending slot for receiving the lead end of such a strip of film were fed side by side down a track to a first position of a four position rotor. The spools were taken one by one from the track and secured on the rotor by a first pair of quills mounted on the rotor, which quills engaged the opposite ends of the spools. The rotor then indexed to a second position where the first pair of quills were engaged by a first mechanism on the adjacent support frame and rotated to orient the slot in the core in a first position. At the same time, a second spool was taken from the track by a second pair of quills. The rotor then indexed again to a third position where the lead end of such a strip of film was inserted into the slot in the core and the first pair of quills were engaged by a second mechanism on the adjacent support frame and rotated to wind the strip onto the core. At the same time, a third spool was taken from the track by a third pair of quills and the second spool was rotated by the first mechanism to orient its slot in the first position. The rotor then indexed again to a fourth position where the first pair of quills were engaged by a third mechanism on the adjacent support frame and rotated while an outside label was applied to the spool. At the same time, a fourth spool was taken from the track by a fourth pair of quills, the second spool was rotated by the second mechanism to wind on another strip and the third spool was rotated by the first mechanism to orient its slot.

While the spooling apparatus of the type described performed rather well, it was complicated to set up and maintain. Adjusting the apparatus to correct for defects in the wound spools was difficult since four sets of identical winding quills were used, each of which would have to be checked to determine if it was causing the noted defects. In order to achieve a high machine cycle rate, relatively high accelerations and decelerations were required of the winding quills and the strips of film being spooled, which could cause tension or pressure marks in the film, thus leading to higher rates of rejection. Because the rotor had to be indexed from station to station before winding of a strip of film could occur, the overall portion of the machine cycle available for such winding was limited, making it difficult to correct for tension and pressure marks without reducing the production rate of the machine. The three mechanisms for rotating the quills were crowded around the four position rotor, making maintenance and set-up of the equipment quite difficult. The side-by-side spools in the feed track tended to lock together in the track, thus requiring operator intervention before further operation.

SUMMARY OF THE INVENTION

A primary objective of this invention is to provide an apparatus for spooling strips of web material such as photographic film which is mechanically simpler and more easy to adjust and maintain than prior art spooling apparatus.

Another objective of this invention is to provide such an apparatus in which high production rates are achievable with a higher percentage of the machine cycle devoted to winding the web material, thereby resulting in fewer defects such as tension or pressure marks on the film.

A further objective of this invention is to provide such an apparatus in which machine movements can be controlled mechanically from a common line shaft, so that position, velocity and acceleration are repeatable from cycle to cycle.

Yet another objective of this invention is to provide such an apparatus in which the spool delivery, orientation, winding and labelling stations are spaced from each other to facilitate access for set-up and maintenance.

Still another objective of this invention is to provide such an apparatus in which the quills for rotating the spools are mounted to the frame of the apparatus, rather than to a multiple position rotor.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

An apparatus according to the invention is particularly suited for winding strips of web material onto spools and comprises a support frame and means mounted on the frame for delivering empty spools of the type having a core with a longitudinally extending slot for receiving a lead end of such a strip. Means are mounted on the frame for orienting each such spool with such slot in a first position. A first spool transfer arm is pivotably mounted on the frame for movement about a first axis, the first spool transfer arm supporting first means for removing spools one at a time from the means for delivering and transferring each spool to the means for orienting. Means are mounted on the frame for rotating each such spool to wind such a strip thereon. A second spool transfer arm is pivotably mounted on the frame for movement about a second axis spaced from the first axis, the second spool transfer arm supporting second means for removing spools one at a time from the means for orienting and transferring each spool to the means for rotating with such slot in a second position to receive such lead end. Means are provided for guiding such lead end into such slot at the means for rotating. A third spool transfer arm is pivotably mounted on the frame for movement about a third axis spaced from the first and second axes, the third spool transfer arm supporting means for removing wound spools one at a time from the means for rotating and transferring each wound spool to a subsequent processing station.

The means for delivering empty spools may comprise a conduit positioned essentially parallel to the first axis, through which conduit such spools move end-to-end into engagement with the first means for removing. The means for orienting may comprise a housing mounted on the frame; a head stock rotatably supported by the housing for engaging one end of such spools; a tail stock supported by the housing for engaging the other end of such spools; means for moving the head and tail stocks axially toward each other to engage such spools while such spools are held by the first means for removing; and means for rotating the head stock to orient such slot in the first position. A similar head and tail stock assembly is used as the means for rotating each spool to wind such a strip onto the spool, though in this instance the tail stock is rotatable. In the preferred embodiment, the core of each spool includes end surfaces having features engageable by the head and tail stocks, such features being positioned at a predetermined angle to such slot, and the tail stock of the means for orienting comprises means for determining when such feature has been engaged by that tail stock and for producing a signal to stop rotation of the headstock of the means for orienting when such slot has reached the first position.

Each of the spool transfer arms may comprise a mechanical oscillator mounted on the back of the support frame; and a link mounted at one end to the oscillator for movement about the respective axis. The first means for removing may be mounted at the other end of the link of the first spool transfer arm to cooperate with the means for delivering and the means for orienting. Similarly, the second means for removing may be mounted at the other end of the link of the second spool transfer arm to cooperate with the means for orienting and the means for rotating each spool. And, the means for removing wound spools may be mounted at the other end of the link of the third spool transfer arm to cooperate with the means for rotating each spool.

The first means for removing may comprise a cradle for receiving such spools from the means for delivering; and vacuum means for stabilizing such spools in the cradle. The second means for removing preferably comprises first means, rotatably mounted at the other end of the link of the second spool transfer arm, for gripping such spools at the means for orienting; and means, mounted on the frame and connected to the first means for gripping, for rotating the first means for gripping relative to the link as the arm moves about its axis, from a first position for removing spools from the means for orienting to a second position with the slot of the spool positioned to receive the lead end of a strip. The first means for gripping may comprise a body having a semicylindrical recess for engaging the core of such a spool and vacuum means for holding such cores in the recess.

The third means for removing wound spools preferably comprises second means, rotatably mounted at the other end of the link of the third spool transfer arm, for gripping completed wound spools at the means for rotating; and means, mounted on the frame and connected the means for gripping, for rotating the second means for gripping relative to the link as the arm moves about its axis, from a first position for removing wound spools from the means for rotating to a second position for transferring such wound spools to a subsequent processing station.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

OVERALL STRUCTURE AND OPERATION

Figure 1:
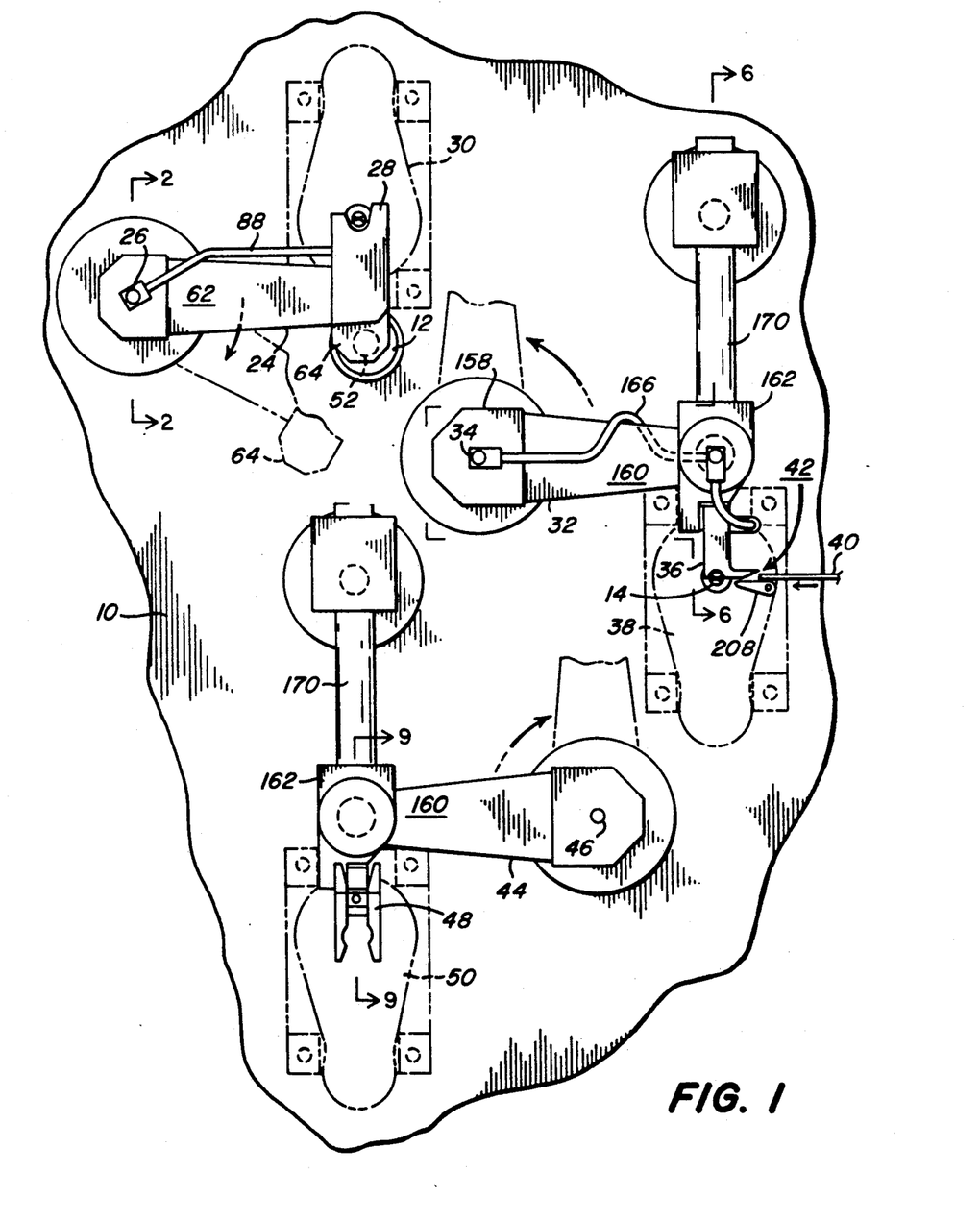
FIG. 1 shows a front elevation view of the apparatus according to the invention, with the range of motion of certain components being illustrated in phantom.
Figure 3:
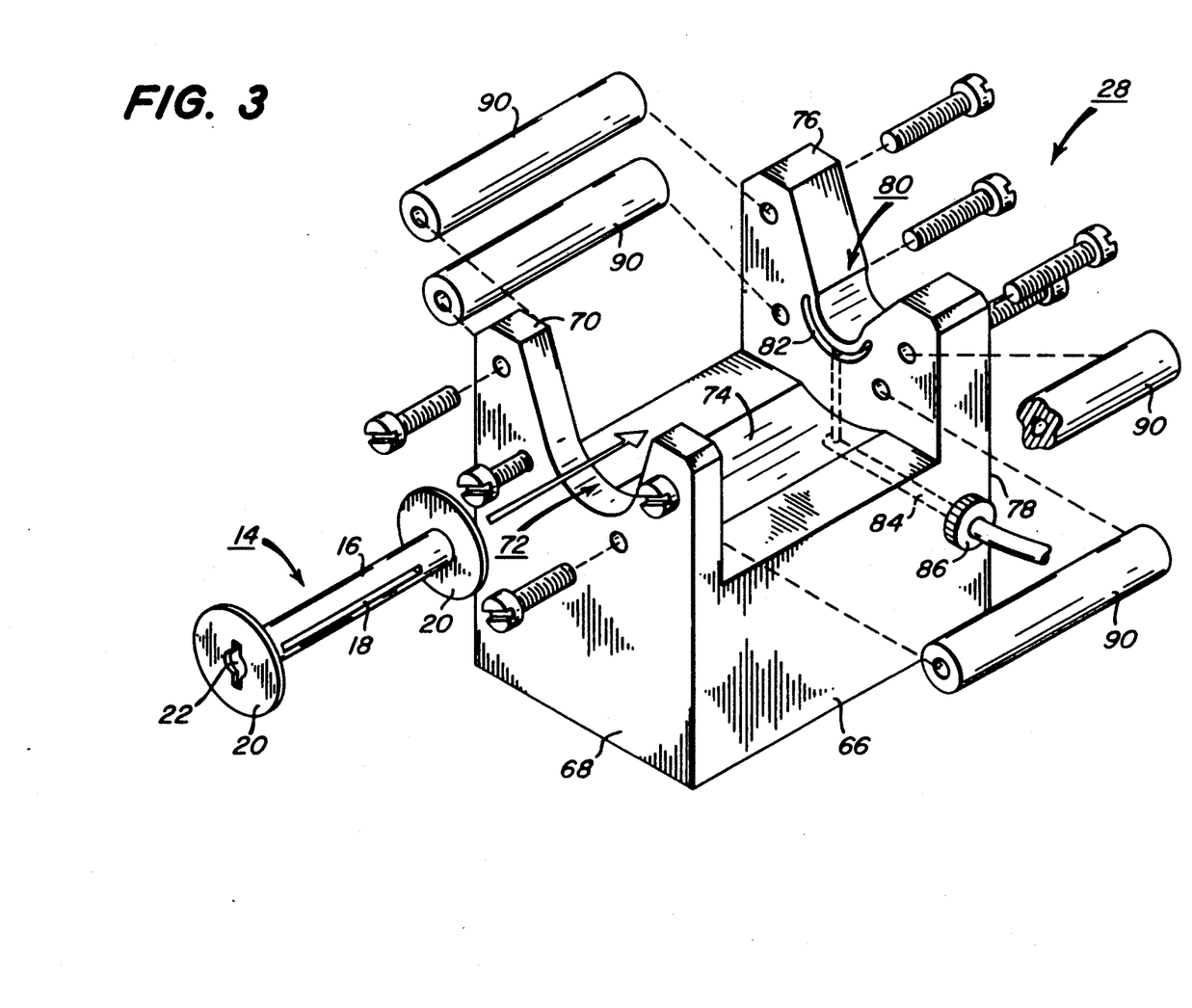
FIG. 3 shows an exploded perspective view of the cradle which receives empty spools and holds them for transfer to the spool orienting station.

FIG. 1 shows a front elevation view of the apparatus of the invention. An upwardly standing rigid face plate 10 provides a support frame for the apparatus. Means 12 are provided for delivering empty spools 14 of the type shown in FIG. 3 on which strips of web material such as photographic film or paper, or both, are to be wound. As shown in FIG. 3, spools 14 comprise an an elongated core 16 having a length corresponding to the width of the strips to be wound and a longitudinally extending through slot 18 for receiving the lead end of such a strip. End flanges 20 are provided at either end of core 16 and the exterior surfaces of flanges 20 are provided with a central key slot 22 or similar feature oriented at an angle of, for example, 90° to slot 18. Key slot 22 provides both a means for determining the orientation of slot 18 and a means for engaging the spool during winding of a film strip.

Referring again to FIG. 1, a first spool transfer arm assembly 24 is pivotably mounted to face plate 10 for rotation about a first axis 26 from the lower position shown in phantom to the upper position shown in solid lines in FIG. 1. Arm assembly 24 supports at its outer end a first means 28 for removing spools one at a time from spool delivering means 12 in such lower position. Means 28 then holds the spools during transfer to such upper position where the spools are engaged by a means 30, illustrated in phantom in FIG. 1 and in section in FIG. 4, for orienting slot 18 in a first position. Once a spool has been engaged by means 30, transfer arm assembly 24 is rotated downward to such lower position to remove the next spool.

After a spool has been oriented, it is removed from means 30 by a second spool transfer arm assembly 32 pivotably mounted to face plate 10 for rotation about a second axis 34 spaced from axis 26. Arm assembly 32 moves between the upper position shown in phantom and the lower position shown in solid lines in FIG. 1. At its outer end, arm assembly 32 supports a second means 36 for removing spools from orienting means 30 in such upper position. Means 36 then holds the the oriented spools during transfer to such lower position, with slot 18 of each spool oriented to receive the lead end of a strip of web material. As will be discussed subsequently, means 36 is rotated relative to arm assembly 32 during transfer to such lower position, so that slot 18 will be properly oriented. The spools then are engaged by a means 38, shown in phantom in FIG. 1, for rotating the spool to wind a strip 40 thereon. Means 42 are provided for guiding the lead end of the strip into slot 18. Once strip 40 has become cinched onto spool 14, transfer arm assembly 32 is rotated upward to such upper position to acquire the next oriented spool.

After transfer arm assembly 32 has rotated away from rotating means 38, strip 40 is rapidly wound onto the spool in less than one second. A third spool transfer arm assembly 44 is pivotably mounted to face plate 10 for rotation about an axis 46 spaced from axes 26 and 34. Arm assembly 44 moves between the upper position shown in phantom and the lower position shown in solid lines in FIG. 1. At its outer end, arm assembly 44 supports a third means 48 for removing wound spools from rotating means 38 in such upper position. Means 48 then holds the wound spools during transfer to such lower position. As will be discussed subsequently, means 48 is rotated relative to arm assembly 44 during transfer to such lower position, so that means 48 will be properly oriented for cooperation with a subsequent processing station 50, shown in phantom in FIG. 1 where, for example, a strip of tape may be applied to the wound spool to prevent its unwinding. Once the wound spool has been acquired by processing station 50, transfer arm assembly 44 is rotated upward to such upper position to acquire the next wound spool.

SPOOL DELIVERY AND ORIENTATION

Figure 2:
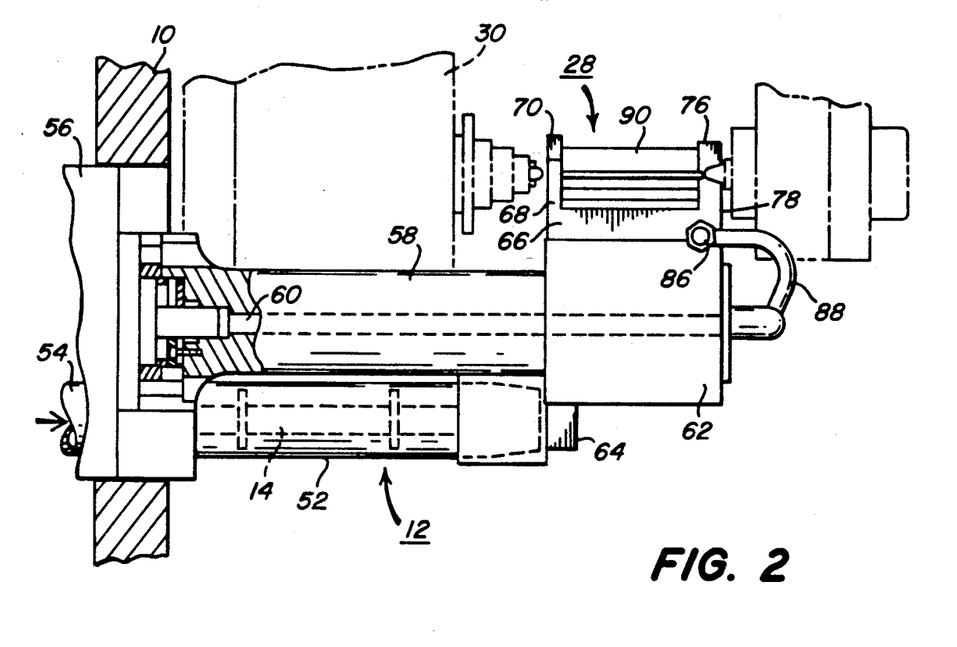
FIG. 2 shows a view, partially in section and taken along line 2—2 of FIG. 1, of the apparatus for transferring empty spools to the spool orienting station.

As shown in FIG. 2, means 12 for delivering empty spools comprises a feed tube 52 mounted to face plate 10 below transfer arm assembly 24 to receive a series of empty spools 14 moving end-to-end from a conduit 54 extending through from the back side of face plate 10. Transfer arm assembly 24 comprises a mechanical rotating oscillator 56 mounted on the back of face plate 10. Oscillator 56 preferably is of the conventional type having an input shaft, not illustrated, which extends horizontally and parallel to the back side of face plate 10, for a purpose to be discussed subsequently. A standoff post 58 is mounted on the output of oscillator 56 and provided with an axial bore 60 for application of vacuum to first means 28 for removing empty spools. A link or arm member 62 is secured to the outer end of post 58 for rotation therewith, means 28 being mounted on the outer end of link 62. A stop plate 64 is attached to the under side of link 62 near its outer end, in position to block the exit from feed tube 52 when arm assembly 24 is in the upper position illustrated in FIGS. 1 and 2.

FIG. 3 illustrates the details of first means 28 for removing empty spools from feed tube 52. A cradle block 66 is attached to the upper side of link 62 at its outer end. At its inboard end 68, cradle block 66 is provided with an upwardly extending flange 70 having through its thickness an upwardly opening U-shaped passage 72 whose curved lower portion is sized to pass flanges 20 of spool 14. When arm assembly 24 is in the lower position illustrated in FIG. 1, the lower portion of passage 72 aligns with the exit from feed tube 52, thus permitting a spool to move axially through passage 72 above an upwardly concave cylindrical surface 74 which extends from flange 70 to a further upwardly extending flange 76 positioned at the outboard end 78 of cradle block 66. Flange 76 has through its thickness an upwardly opening U-shaped passage 80 whose curved lower portion is substantially smaller in radius than passage 72, so that each spool 14 stops against the inboard surface of flange 76. Extending around the lower portion of passage 80 is an arcuate groove 82 machined into the inboard surface of flange 76. Groove 82 communicates with a vacuum passage 84 provided in cradle block 66, as illustrated in phantom in FIG. 3. Passage 84 communicates with a suitable connector 86 which, as shown in FIG. 2, is connected to axial bore 60 by a flexible conduit 88. Thus, application of vacuum to groove 82 grips a portion of the leading flange 20 and stabilizes spool 14 within the cradle. To support spools 14 and prevent them from moving laterally from between end flanges 70, 76, four support pins 90 extend between flanges 70, 76; so that, the edges of end flanges 20 slide along pins 90 as each spool moves through passage 72, above surface 74 and into contact with flange 76.

Figures 4, 5:
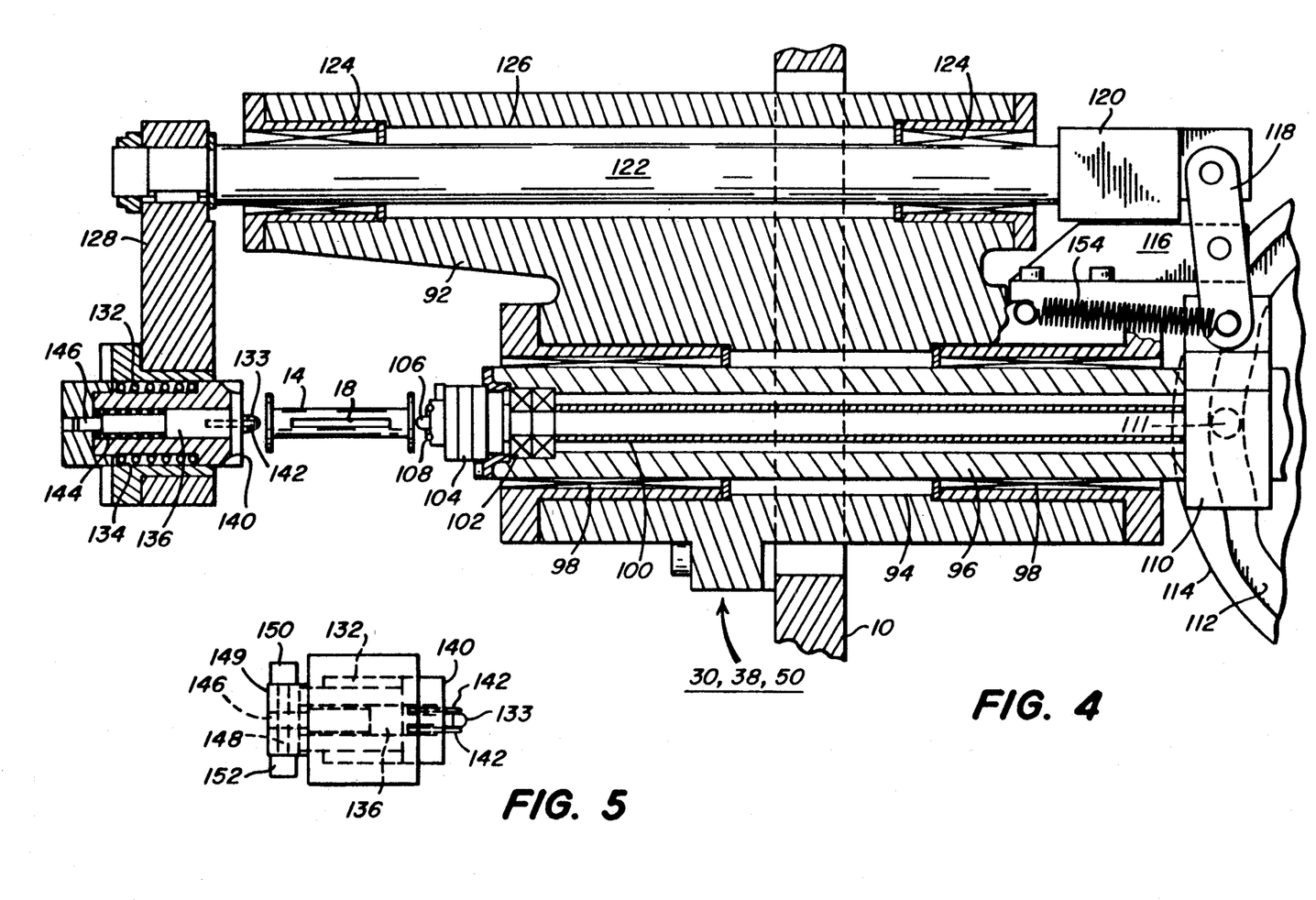
FIG. 4 shows a section view, as seen from the right in FIG. 1, of the spool orienting head and tail stock mechanism according to the invention.
FIG. 5 shows a view, partially in phantom, of the underside of the tail stock of the apparatus of FIG. 4.

Once a spool has moved from from feed tube 52 and has been gripped by vacuum acting in groove 82, arm assembly 24 is rotated to the upper position shown in FIGS. 1 and 2, where the spool is acquired by means 30 for orienting the spool. As shown in FIG. 4, means 30 comprises a housing 92 which is mounted on face plate 10. A through bore 94 surrounds a hollow head stock spline shaft 96 slidably mounted in a pair of linear bearings 98. Positioned coaxially within spline shaft 96 is a head stock drive shaft 100 rotatably mounted in a pair of bearings 102, only the outboard one of which appears in FIG. 4. At its inboard end, drive shaft 100 is operatively connected for rotation by a motor, not illustrated; while at its outboard end, a driven head stock 104 is fixedly mounted. On the axis of drive shaft 100, head stock 104 fixedly supports a rounded probe tip 106 which is sized to enter the center portion of central slot 22 on spool 14. Frictional engagement with end flange 20 of spool 14 is provided by a resilient O-ring 108 which surrounds probe tip 106. An actuator bracket 110 is attached near the inboard end of spline shaft 96 and comprises on one side a cam follower roller 111, illustrated in phantom, which rides in a circumferentially extending slot 112 of a rotatable face cam 114, shown fragmentarily. The drive shaft for face cam 114, not illustrated, preferably extends horizontally and parallel to the back side of face plate 10. Slot 112 comprises over most of its circumference a constant radius dwell segment which causes actuator bracket 110 to remain stationary. To cause spline shaft 96 to move to the left as illustrated in FIG. 4, slot 112 comprises a section of increased radius, illustrated in phantom in FIG. 4. Thus rotation of face cam 114 causes spline shaft 96 to move to the left so that head stock 104 can engage a spool 14 once the spool has been positioned by transfer arm assembly 24.

A bracket 116 is fixedly mounted on housing 92 and pivotably supports a crank arm 118 which is pivotably connected at one end to actuator bracket 110 and pivotably connected at the other end to an actuator block 120 fixedly attached to the inboard end of a tail stock spline shaft 122 slidably supported by a pair of linear bearings 124 mounted within a through bore 126 provided in housing 92 parallel to through bore 94. At the outboard end of spline shaft 122, a tail stock support arm 128 is fixedly mounted. A non-rotatable but axially slidable tail stock 130 is mounted within a housing 131 at the free end of support arm 128, for movement against a compression spring 132 along an axis coincident with that of head stock 104. A central probe tip 133 is fixed to tail stock 130 and coaxially faces probe tip 106. Within tail stock 130, an axially extending bore 134 slidably retains a resiliently biased plunger 136 fixedly supporting at one end a pair of locator probes 142 which flank probe tip 133 and slidably extend through openings in the face 140 of tail stock 130. Thus probe tip 133 and locator probes 142 will fit into slot 22 in spool 14, provided that the spool is properly oriented relative to the probes. A spring 144 biases plunger 136 so that probes 142 will extend past face 140 when a spool 14 is moved into position by transfer arm 24. As shown in FIGS. 4 and 5 the outboard end 146 of plunger 136 is positioned to move across a transverse bore 148 provided through the retainer cap 149 for tail stock 130. Outboard end 146 thus can pass between an infrared source 150 and an infrared detector 152 located at opposite ends of bore 148. So, movement of plunger 136 to the left as illustrated in FIGS. 4 and 5 will interrupt communication between source 150 and detector 152.

In operation of the apparatus shown in FIGS. 4 and 5, a spool is moved by transfer arm 24 into the position illustrated, with the axis of the spool approximately aligned with that of head stock 104 and tail stock 130. With spool 14 thus positioned, face cam 114 causes actuator bracket 110 to move to the left, with the assistance of preload spring 154; so that, head stock 104 will move through passage 72 in cradle block 66 and probe tip 106 will enter slot 22. At the same time, crank arm 118 causes actuator block 120 to move to the right; so that, tail stock 130 will move toward head stock 104 through passage 80 in cradle block 66. If spool 14 fortuitously is positioned properly, probe tip 106 on head stock 104 and probe tip 133 and locator probes 142 on tail stock 130 all will be able to enter their respective slots 22 at the ends of the spool. However, if the spool is rotated away from such a position, locator probes 142 will be prevented from entering slot 22 as tail stock 130 engages the spool. While probe tip 133 enters slot 22, probes 142 and plunger 136 will be forced to the left, as seen in FIGS. 4 and 5, against the action of spring 144; so that, transverse bore 148 will be blocked by outboard end 146 of plunger 136. To orient spool 14, head stock drive shaft 100 is rotated, thus causing spool 14 to rotate due to the frictional engagement provided by O-ring 108. Eventually, the slot 22 opposite locator probes 142 will rotate into a position which permits locator probes 142 to fully enter their respective slot 22 under the influence of spring 144. When this happens, plunger 136 moves to the right and communication between source 150 and detector 152 is reestablished. The output of detector 152 is sensed by a suitable controller, not illustrated, which then stops rotation of shaft 100 with slot 18 of spool 14 in a predetermined position, such as vertical with respect to the axis of spool 14. The orientation of slot 18 thus has been established and spool 14 is ready to be removed from orienting means 30 and transferred to rotating means 38.

SPOOL REMOVAL, TRANSFER AND ROTATION TO WIND STRIP 40

Figure 6:
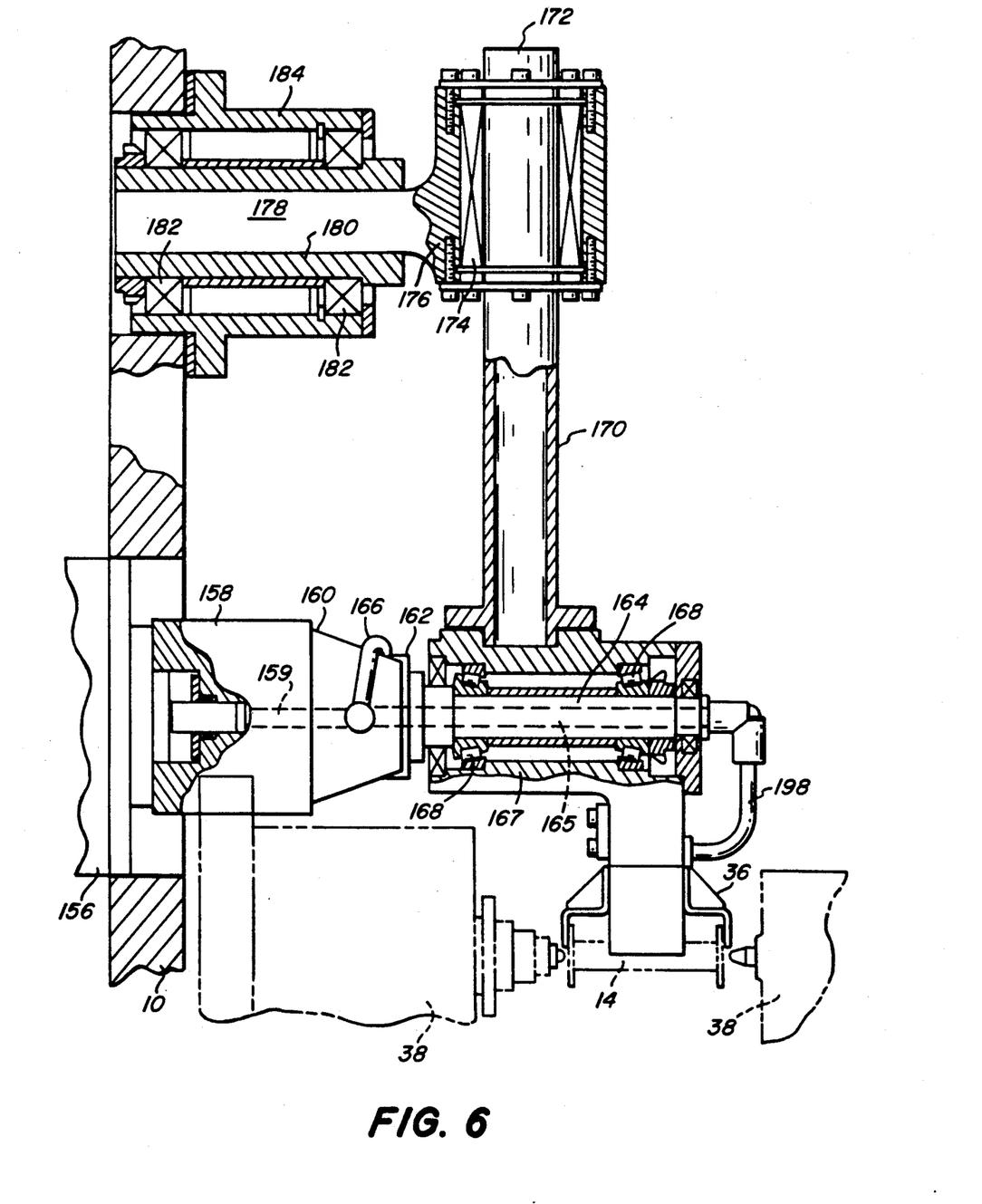
FIG. 6 shows a view, partially in section and taken along line 6—6 of FIG. 1, of the apparatus for removing spools from the spool orienting station and transferring them to the spool winding station.
Figure 7:
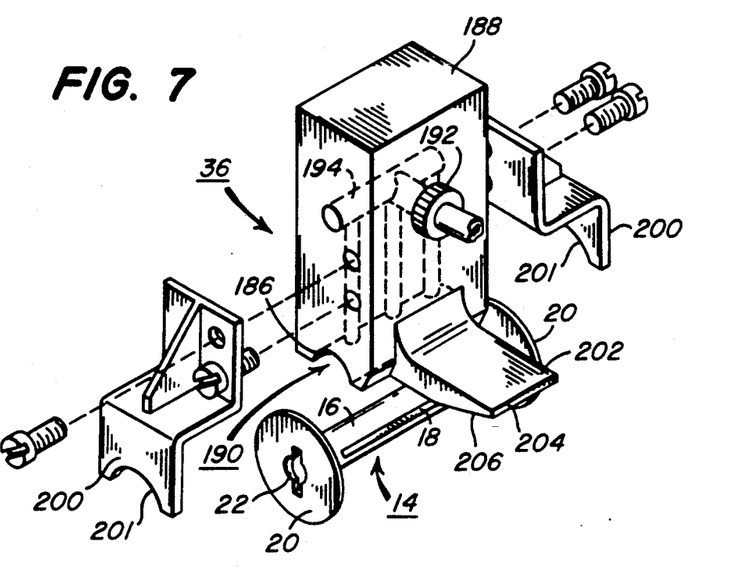
FIG. 7 shows an exploded perspective view of the means for gripping spools at the spool orienting station and holding them during transfer to the spool winding station.

The structure of spool transfer arm assembly 32 and second means 36 for removing spools is illustrated in FIGS. 6 and 7. Transfer arm assembly 32 comprises a mechanical rotating oscillator 156 mounted on the back of face plate 10. Oscillator 156 also preferably is of the conventional type having an input shaft, not illustrated, which extends horizontally and parallel to the back side of face plate 10. This paralle orientation of the input shafts of oscillators 56 and 156 and face cam 114 permits means 12, 30, 38 and 50 to be driven from a common line shaft at the back side of face plate 10, not illustrated, thus simplifiying the drive train of the apparatus. A stand-off block 158 is mounted on the output of oscillator 156 and provided with an interior bore 159, shown in phantom, for application of vacuum to second means 36 for removing empty spools. A link or crank arm member 160 is secured to the outer end of block 158 for rotation therewith, means 36 being mounted on the outer end of link 160. A mounting block 162 is fixedly supported on the outer end of link 160 and supports one end of a hollow shaft 164 which extends parallel to second axis 34. The interior bore 165 of shaft 164 is connected to interior bore 159 of block 158 by means of a suitable flexible conduit 166, shown in FIGS. 1 and 6. A housing 167 is rotatably mounted on shaft 164 by means of a pair of bearings 168. Affixed perpendicularly to the side of housing 167 is a slider shaft 170, whose outer end 172 extends through a linear bearing 174 supported by a housing 176. A pivot shaft 178 extends from housing 176 at a right angle to the axis of slider shaft 170 and is mounted within a bearing sleeve 180 rotatably supported by a pair of bearings 182 mounted in a housing 184 fixedly attached to face plate 10. Thus, as link 160 is rotated about axis 34, slider shaft 170 moves through linear bearing 174 which in turn rotates with shaft 178, thereby rotating housing 167. Slider and crank mechanisms are known to those skilled in the mechanical arts which are of the general type comprised in link 160, block 162, shaft 164, housing 167, shaft 170, bearing 174, housing 176 and shaft 178.

Second means 36 for removing spools is mounted on the side of housing 167 diametrically opposite to slider shaft 170 and, as shown in FIG. 7, comprises a vacuum gripper head 186 formed by a body block 188 having in its lower end surface a transversely extending semicylindrical recess 190 having an axial length less than the length of core 16 of spool 14. A vacuum connector 192 attached to one face of block 188 communicates with a transverse bore 194 within the block, which in turn communicates with a plurality of downwardly extending bores 196 which open into recess 190. A conduit 198, shown in FIG. 6, extends from connector 192 to a similar connector for bore 165; so that, vacuum in bore 159 is applied through conduit 166, bore 165, conduit 198 and bores 194, 196 to recess 190. Thus, when recess 190 is fitted over core 16 after orientation of slot 18 and vacuum is applied, spool 14 becomes securely held by gripper head 186 for transfer to means 38 for rotating the spool to wind strip 40. To prevent spool 14 from moving axially when probe tips 106, 133 are withdrawn after orientation and to ensure that spool 14 will be properly positioned axially for transfer, a pair of spool stop brackets 200 are affixed to the sides of block 188 above recess 190, each stop bracket comprising a downwardly opening recess to pass the orienting and winding quills of means 30 and 38. To ensure that strip 40 is properly guided into slot 18, block 188 is provided near its lower edge with an outwardly extending guide foot 202 having a tip edge 204 and an upwardly flaring undersurface 206 which extends away from the upper edge of slot 18 when spool 14 is held in recess 190. In operation, undersurface 206 cooperates with a pivotable lip plate 208, shown in FIG. 1, to provide a narrow throat through which the lead end of strip 40 is guided into slot 18. When the rounded or tapered probe tips of means 38 engage slots 22, spool 14 is pulled slightly away from recess 190, but gripper head 186 remains in place momentarily. When spool 14 is rotated clockwise as viewed in FIG. 7, the lead end of strip 40 becomes folded over between core 16 and recess 190 to secure strip 40 to core 16 for further winding. Once core 16 has been rotated sufficiently that the lead end has become cinched around the core, gripper head 186 is swung away by transfer arm 32 to pick up the next oriented spool. At the same time, lip plate 208 is pivoted downward to provide adequate space for strip 40 to be wound onto spool 14.

Figure 8:
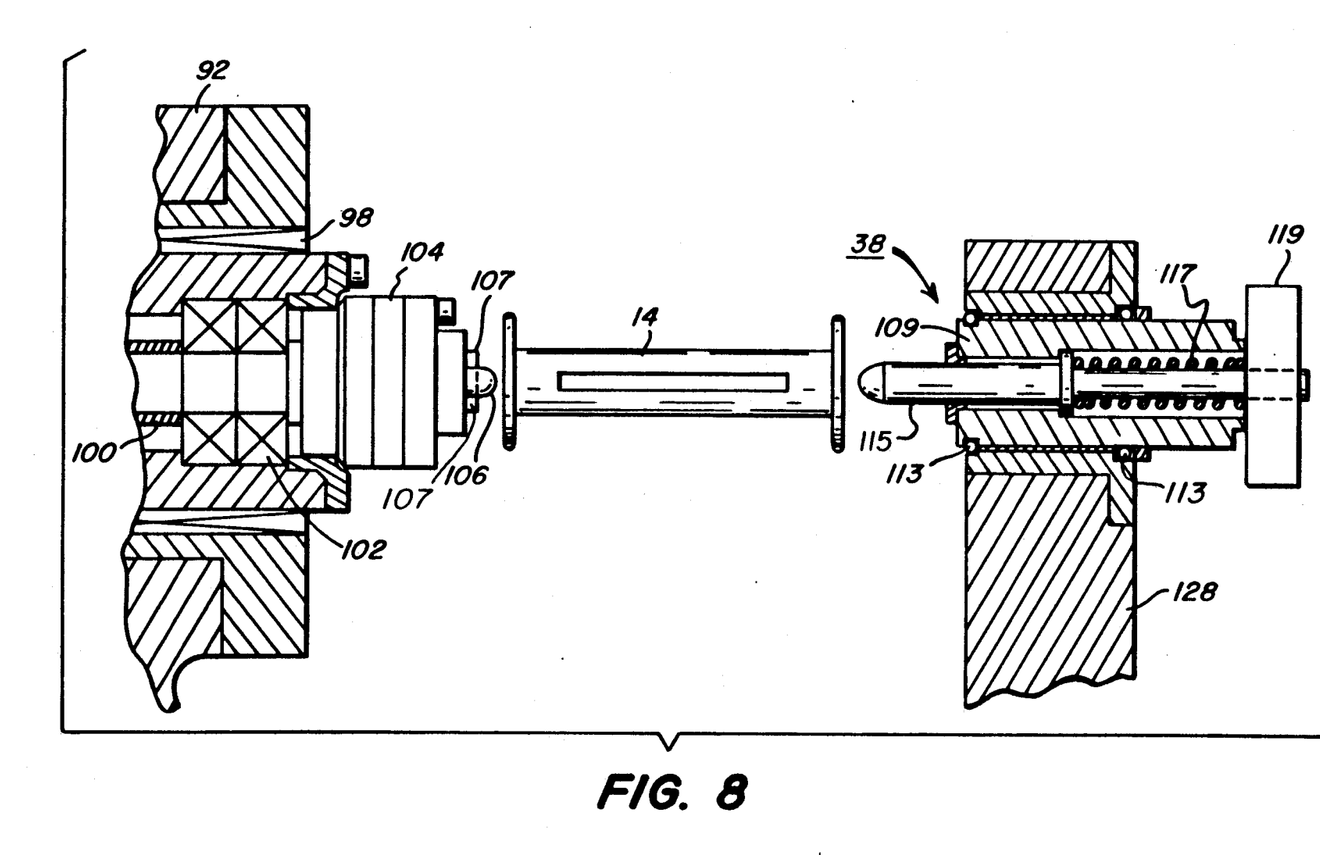
FIG. 8 shows a fragmentary view of the spool winding head and tail stock mechanisms according to the invention.
Figure 9:
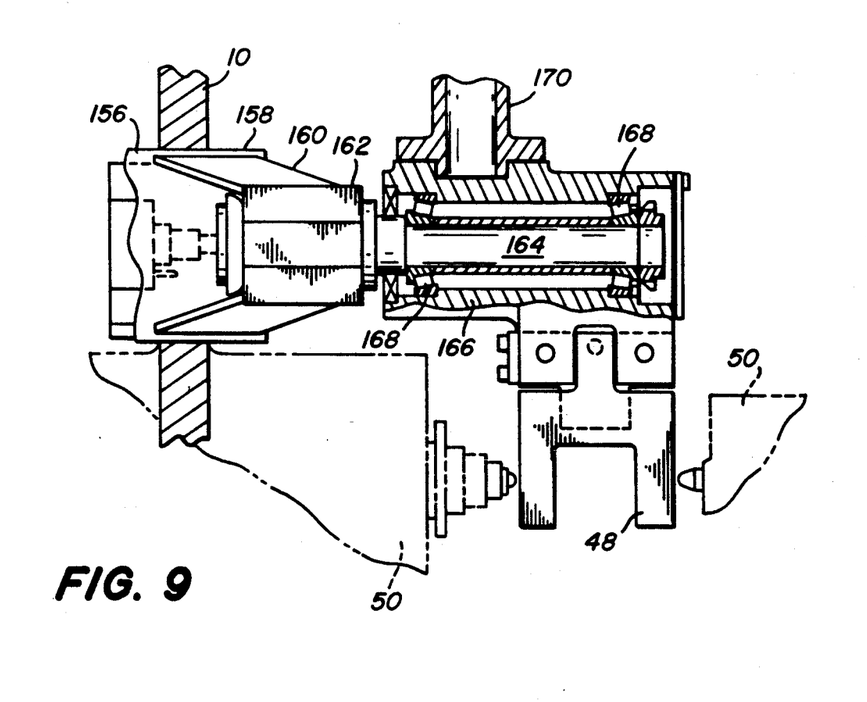
FIG. 9 shows a view, partially in section and taken along line 9—9 of FIG. 1, of the apparatus for removing spools from the spool winding station and transferring them to a subsequent processing station.

Except for the preferred geometry of its head and tail stocks, means 38 preferably is identical in structure to means 30 of FIG. 4, though inverted in position to allow means 36 for removing spools to be swung between the quills to the position of FIG. 1. As shown in FIG. 8, probe tip 106 is provided with a pair of diametrically extending keys or wings 107 which positively engage slot 22 of each spool; and friction O-ring 108 has been omitted. A rotatable, axially slidable tail stock 109 is mounted in support arm 128 by means of a pair of bearings 113. A probe plunger 115 is slidably mounted within tail stock 109 and is biased toward the spool by a spring 117. A hand knob 119 on plunger 115 permits manual retraction and rotation of the plunger if necessary to remove or adjust the position of a spool. In operation, both probe tip 106 and probe plunger 115 rotate during winding of a spool.

SPOOL REMOVAL FOR SUBSEQUENT PROCESSING

Figure 10:
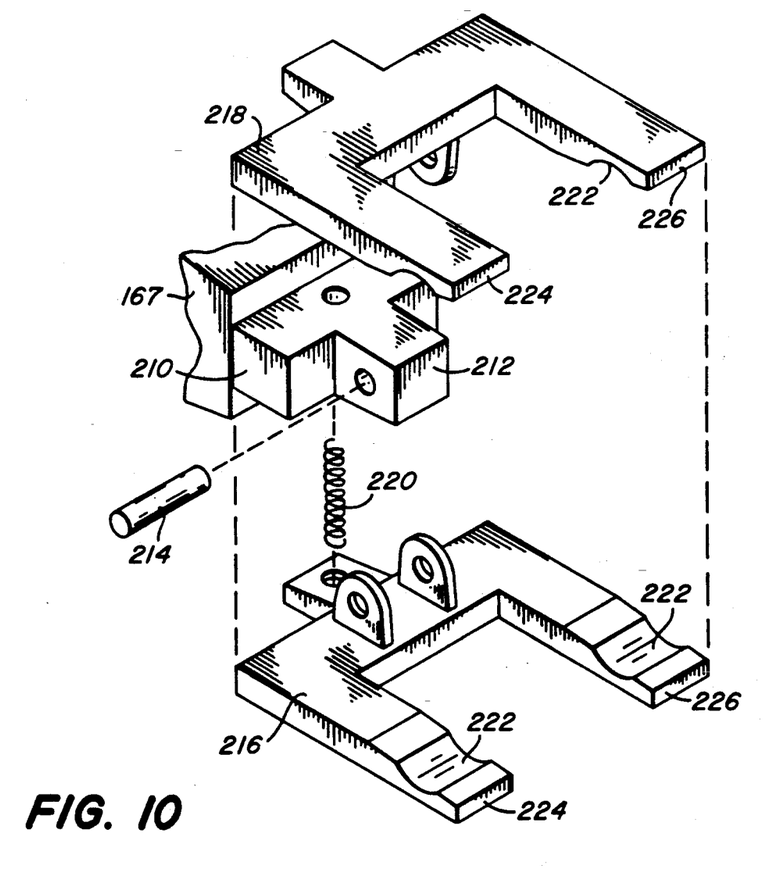
FIG. 10 shows an exploded, perspective view of a passive spool gripper mechanism according to the invention.

Just after gripper head 186 has swung away, third spool transfer arm 44 swings third means 48 into position about the spool as the winding is completed, to grasp the wound spool for transfer to subsequent processing station 50. The structure of spool transfer arm assembly 44 and third means 48 for removing spools is illustrated in FIGS. 1, 6 and 10. Transfer arm assembly 44 is mechanically equivalent to transfer arm assembly 32 as previously described except that no vacuum application bores are required. Third means 48 for removing spools is mounted on the side of housing 167 as shown in FIGS. 1 and 10. Means 48 comprises a type of passive spool gripper which is slipped over the spool as the wind is ending, just as third spool transfer arm 44 nears the end of its rotation from processing station 50 to means 38 for rotating the spool. Means 48 essentially is a spring clip which grasps the wound spool near its ends and for this purpose comprises a support block 210 having a central boss 212 with a bore for receiving a pivot pin 214. A pair of gripper arms 216,218 is pivotably mounted on pin 214 and baised apart on one side of the pivot by a compression spring 220 which extends through a bore in support block 210. At their opposite ends, arms 216,218 are provided with smoothly finished recesses 222 for engaging the outer surface of the wound spool. If desired, means 48 can be configured to grip core 16 of an empty spool in case a spool is not wound for some reason, as well as a fully wound spool. Each gripper arm 216,218 is formed with a pair of laterally spaced fingers 224,226 which are separated by a distance chosen to place the fingers just inside flanges 20 of spool 14. In use, means 48 is slipped over the spool near the end of the wind and serves to hold the end of strip 40 in place on the wound spool during transfer to processing station 50. Once the wound spool is complete, third spool transfer arm 44 swings away toward the position illustrated in FIG. 1. Processing station 50 may comprise another set of winding quills identical to those of means 38 for rotating, which could be used, for example, to rotate the spool during application of a retaining label by means not illustrated. Preferably, means 50 comprises the head stock of FIG. 4 and the tail stock of FIG. 8. As soon as the wound spool is removed from means 38, a new oriented spool is swung into place by means 32 and the process repeats.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for winding strips of web material onto spools, comprising:
   a support frame;
   means mounted on said frame for delivering empty spools of the type having a core with a longitudinally extending slot for receiving a lead end of a strip;
   means mounted on said frame for orienting each said spool with said slot in a first position;
   a first spool transfer arm pivotably mounted on said frame for movement about a first axis, said first spool transfer arm supporting first means for removing spools one at a time from said means for delivering and transferring each spool to said means for orienting;
   means mounted on said frame for rotating each said spool to wind said strip thereon;
   a second spool transfer arm pivotably mounted on said frame for movement about a second axis spaced from said first axis, said second spool transfer arm supporting second means for removing spools one at a time from said means for orienting and transferring each spool to said means for rotating with said slot in a second position to receive said lead end;
   means for guiding said lead end into said slot at said means for rotating; and
   a third spool transfer arm pivotably mounted on said frame for movement about a third axis spaced from said first and second axes, said third spool transfer arm supporting third means for removing wound spools one at a time from said means for rotating and transferring each wound spool to a subsequent processing station.

2. Apparatus according to claim 1, wherein said means for delivering empty spools comprises a conduit positioned essentially parallel to said first axis, through which conduit said spools move end-to-end into engagement with said first means for removing.

3. Apparatus according to claim 1 wherein said first spool transfer arm comprises:
   a mechanical oscillator mounted on said frame; and
   a link mounted at one end to said oscillator for movement about said first axis, said first means for removing being mounted at the other end of said link to cooperate with said means for delivering and said means for orienting.

4. Apparatus according to claim 3, wherein said first means for removing comprises:
   a cradle for receiving said spools from said means for delivering; and
   vacuum means for holding said spools in said cradle.

5. Apparatus according to claim 1, wherein said second spool transfer arm comprises:
   a mechanical oscillator mounted on said frame;
   a link mounted at one end to said oscillator for movement about said second axis; and
   said second means for removing comprises:
   means, rotatably mounted at the other end of said link, for gripping said spools at said means for orienting; and
   means, mounted on said frame and connected to said means for gripping, for rotating said means for gripping relative to said link, as said arm moves about said second axis, from a first position for removing said spools from said means for orienting to a second position with said slot in said second position.

6. Apparatus according to claim 5, wherein said means for gripping comprises:
   a body having a semicylindrical recess for engaging said core of said spools; and
   vacuum means associated with said recess for holding said cores in said recess.

7. Apparatus according to claim 1, wherein said third spool transfer arm comprises:
   a mechanical oscillator mounted on said frame;
   a link mounted at one end to said oscillator for movement about said third axis; and
   said third means for removing comprises:
   means, rotatably mounted at the other end of said link, for gripping said spools at said means for rotating; and
   means, mounted on said frame and connected to said means for gripping, for rotating said means for gripping relative to said link, as said arm moves about said third axis, from a first position for removing said spools from said means for rotating to a second position for transferring said spools to a subsequent processing station.

8. Apparatus according to claim 7, wherein said means for gripping comprises:
   a support block rotatably mounted at the other end of said link;
   a pair of opposed gripper fingers pivotably mounted to said support block, each of said gripper fingers comprising at one end a recess for engaging said spools; and
   means for resiliently biasing said gripper fingers so that said recesses engage said spools on opposite sides of said cores.

9. Apparatus according to claim 1, wherein:
   said means for delivering empty spools comprises a conduit positioned essentially parallel to said first axis, through which conduit said spools move end-to-end into engagement with said first means for removing;
   said first spool transfer arm comprises a mechanical oscillator mounted on said frame; and a link mounted at one end to said oscillator for movement about said first axis, said first means for removing being mounted at the other end of said link to cooperate with said means for delivering and said means for orienting; and
   said first means for removing comprises a cradle for receiving said spools from said means for delivering; and vacuum means for holding said spools in said cradle.

10. Apparatus according to claim 1, wherein:
    said means for orienting comprises a housing mounted on said frame; a head stock rotatably supported by said housing for engaging one end of said spools; a tail stock rotatably supported by said housing for engaging the other end of said spools; means for moving said head and tail stocks axially toward each other to engage said spools while said spools are held by said first means for removing; and means for rotating said head stock to orient said slot in said preferred position; and
    said first spool transfer arm comprises a mechanical oscillator mounted on said frame; and a link mounted at one end to said oscillator for movement about said first axis, said first means for removing being mounted at the other end of said link to cooperate with said means for delivering and said means for orienting.

11. Apparatus according to claim 10, wherein said core includes end surfaces having features engageable by said head and tail stocks, said features being positioned at a predetermined angle to said slot; and said tail stock comprises means for determining when said feature has been engaged by said tail stock and for producing a signal to stop rotation of said headstock when said slot has reached said first position.

12. Apparatus according to claim 10, wherein said first means for removing comprises:
    a cradle for receiving said spools from said means for delivering; and vacuum means for holding said spools in said cradle.

13. Apparatus according to claim 1, wherein:
    said means for rotating said spools comprises a housing mounted on said frame; a head stock rotatably supported by said housing for engaging one end of said spools; a tail stock rotatably supported by said housing for engaging the other end of said spools; means for moving said head and tail stocks axially toward each other to engage said spools while said spools are held by said second means for removing; and means for rotating said head stock to wind said strips thereon;
    said second spool transfer arm comprises a mechanical oscillator mounted on said frame; a link mounted at one end to said oscillator for movement about said second axis; and
    said second means for removing comprises means, rotatably mounted at the other end of said link, for gripping said spools at said means for orienting; and means, mounted on said frame and connected to said means for gripping, for rotating said means for gripping relative to said link, as said arm moves about said second axis, from a first position for removing said spools from said means for orienting to a second position with said slot in said second position.

14. Apparatus according to claim 13, wherein said means for gripping comprises:
a body having a semicylindrical recess for engaging said core of said spools; and
vacuum means associated with said recess for holding said cores in said recess.

15. Appatatus according to claim 1, wherein:
said means for rotating said spools comprises a housing mounted on said frame; a head stock rotatably supported by said housing for engaging one end of said spools; a tail stock rotatably supported by said housing for engaging the other end of said spools; means for moving said head and tail stocks axially toward each other to engage said spools while said spools are held by said second means for removing; and means for rotating said head stock to wind said strips thereon; and
said third spool transfer arm comprises a mechanical oscillator mounted on said frame; a link mounted at one end to said oscillator for movement about said third axis; and said third means for removing comprises means, rotatably mounted at the other end of said link, for gripping said spools at said means for rotating; and means, mounted on said frame and connected to said means for gripping, for rotating said means for gripping relative to said link, as said arm moves about said third axis, from a first position for removing said spools from said means for rotating to a second position for transferring said spools to a subsequent processing station.

16. Apparatus according to claim 15, wherein said means for gripping comprises:
a support block rotatably mounted at the other end of said link;
a pair of opposed gripper fingers pivotably mounted to said support block, each of said gripper fingers comprising at one end a recess for engaging said spools; and
means for resiliently biasing said gripper fingers so that said recesses engage said spools on opposite sides of said cores.

17. Apparatus according to claim 1, wherein:
said means for orienting comprises a first housing mounted on said frame; a first head stock rotatably supported by said first housing for engaging one end of said spools; a first tail stock rotatably supported by said first housing for engaging the other end of said spools; means for moving said first head and tail stocks axially toward each other to engage said spools while said spools are held by said first means for removing; and means for rotating said first head stock to orient said slot in said first position;
said first spool transfer arm comprises a first mechanical oscillator mounted on said frame; and a first link mounted at one end to said first oscillator for movement about said first axis, said first means for removing being mounted at the other end of said first link to cooperate with said means for delivering and said means for orienting;
said means for rotating said spools comprises a second housing mounted on said frame; a second head stock rotatably supported by said second housing for engaging one end of said spools; a second tail stock rotatably supported by said second housing for engaging the other end of said spools; means for moving said second head and tail stocks axially toward each other to engage said spools while said spools are held by said second means for removing; and means for rotating said second head stock to wind said strips thereon;
said second spool transfer arm comprises a second mechanical oscillator mounted on said frame; a second link mounted at one end to said second oscillator for movement about said second axis;
said second means for removing comprises first means, rotatably mounted at the other end of said second link, for gripping said spools at said means for orienting; and means, mounted on said frame and connected to said first means for gripping, for rotating said first means for gripping relative to said second link, as said second link moves about said second axis, from a first position for removing said spools from said means for orienting to a second position with said slot in said second position;
said third spool transfer arm comprises a third mechanical oscillator mounted on said frame; a third link mounted at one end to said third oscillator for movement about said third axis; and
said third means for removing comprises second means, rotatably mounted at the other end of said third link, for gripping said spools at said means for rotating; and means, mounted on said frame and connected to said second means for gripping, for rotating said second means for gripping relative to said third link, as said third link moves about said third axis, from a first position for removing said spools from said means for rotating to a second position for transferring said spools to a subsequent processing station.

18. Apparatus according to claim 17, wherein said core includes end surfaces having features engageable by said first head and tail stocks, said features being positioned at a predetermined angle to said slot, and said first tail stock comprises means for determining when said feature has been engaged by said first tail stock and for producing a signal to stop rotation of said first headstock when said slot has reached said preferred position.

19. Apparatus according to claim 17, wherein said first means for removing comprises:
a cradle for receiving said spools from said means for delivering; and
vacuum means for holding said spools in said cradle.

20. Apparatus according to claim 17, wherein said first means for gripping comprises:
a body having a semicylindrical recess for engaging said core of said spools; and
vacuum means associated with said recess for holding said cores in said recess.

21. Apparatus according to claim 17, wherein said second means for gripping comprises:
a support block rotatably mounted at the other end of said third link;
a pair of opposed gripper fingers pivotably mounted to said support block, each of said gripper fingers comprising at one end a recess for engaging said spools; and
means for resiliently biasing said gripper fingers so that said recesses engage said spools on opposite sides of said cores.

* * * * *